(12) United States Patent
Shiba et al.

(10) Patent No.: US 6,466,890 B1
(45) Date of Patent: Oct. 15, 2002

(54) DEVICE FOR DETECTING ROTATIONAL POSITION DEVIATION

(75) Inventors: Noriyuki Shiba, Tokyo; Ikuo Kotani; Masakatsu Fujita, both of Yokohama, all of (JP)

(73) Assignee: Kabushiki Kaisya Tokyo Kikai Seisakusho (JP)

( * ) Notice: Subject to any disclaimer, the term of this patent is extended or adjusted under 35 U.S.C. 154(b) by 114 days.

(21) Appl. No.: 09/629,528

(22) Filed: Aug. 1, 2000

(30) Foreign Application Priority Data

Sep. 24, 1999 (JP) .......................... 11-270074

(51) Int. Cl.[7] .................. G01P 3/00; G06F 15/00
(52) U.S. Cl. ................. 702/150; 702/106; 702/145; 377/2; 377/49
(58) Field of Search ................. 702/79, 104, 105, 702/106, 150, 145; 377/2, 28–29, 49–50; 303/138, 142, 178

(56) References Cited

U.S. PATENT DOCUMENTS 3,978,727 A * 9/1976 Griverus ...................... 377/50
4,033,633 A * 7/1977 Miller et al. ................ 303/195
4,061,030 A * 12/1977 Griverus ...................... 377/50
4,146,910 A * 3/1979 Oliver et al. ............... 318/603
6,175,607 B1   1/2001 Shiba et al.

FOREIGN PATENT DOCUMENTS

| JP | 6311777 | 4/1994 |
| JP | 10032992 | 3/1998 |
| JP | 2941790 | 6/1999 |

* cited by examiner

Primary Examiner—Bryan Bui
(74) Attorney, Agent, or Firm—Bierman, Muserlian and Lucas (57) ABSTRACT

The present invention relates to a detecting device of rotational position deviation, which detects deviation of the rotational position of machine axes driven by electric motors with pulse signals outputted from pulse generators, which are attached to at least two electric motors. One or more deceleration mechanisms are provided between an electric motor and a machine axis connected to the electric motor. A pulse transducer transforms two pulse trains outputted from the pulse generators to one pulse train, and an integrating counter counts the pulse train which is outputted from the pulse transducer, thus corresponding to the rotation angle. A zero phase pulse is outputted by each rotation of the pulse generator. The invention further comprises a count transducer transforming the count output from the integrating counter, and a calculator of rotational position counter calculating the output of the integrating counter and the count transducer and outputting rotational position errors.

1 Claim, 7 Drawing Sheets

(a) Output of Pulse Transducer 13

(b) Zero Phase Output of Pulse Generator 7

(c) Count Output of Integrating Counter 19

(d) Output of Pulse Transducer 14

(e) Zero Phase Output of Pulse Generator 8

(f) Count Output of Integrating Counter 20 t0

Rotation angle of a pulse generator 3 = $a3/a1 \times 2\pi$
Rotation angle of a pulse generator 3 = $a4/a2 \times 2\pi$

Fig.7

(PRIOR ART)

DEVICE FOR DETECTING ROTATIONAL POSITION DEVIATION

BACKGROUND OF THE INVENTION

1. Field of the Invention

The present invention relates to a device for detecting rotational position deviation, which detects the deviation of the rotational position of machine axes driven by electric motors with pulse signals, which are outputted from pulse generators according to the rotation of the electric motors. It also relates to a device for detecting rotational position deviation in order to precisely synchronously control axes driven by plural electric motors.

2. Description of the Related Art

Figure 6:
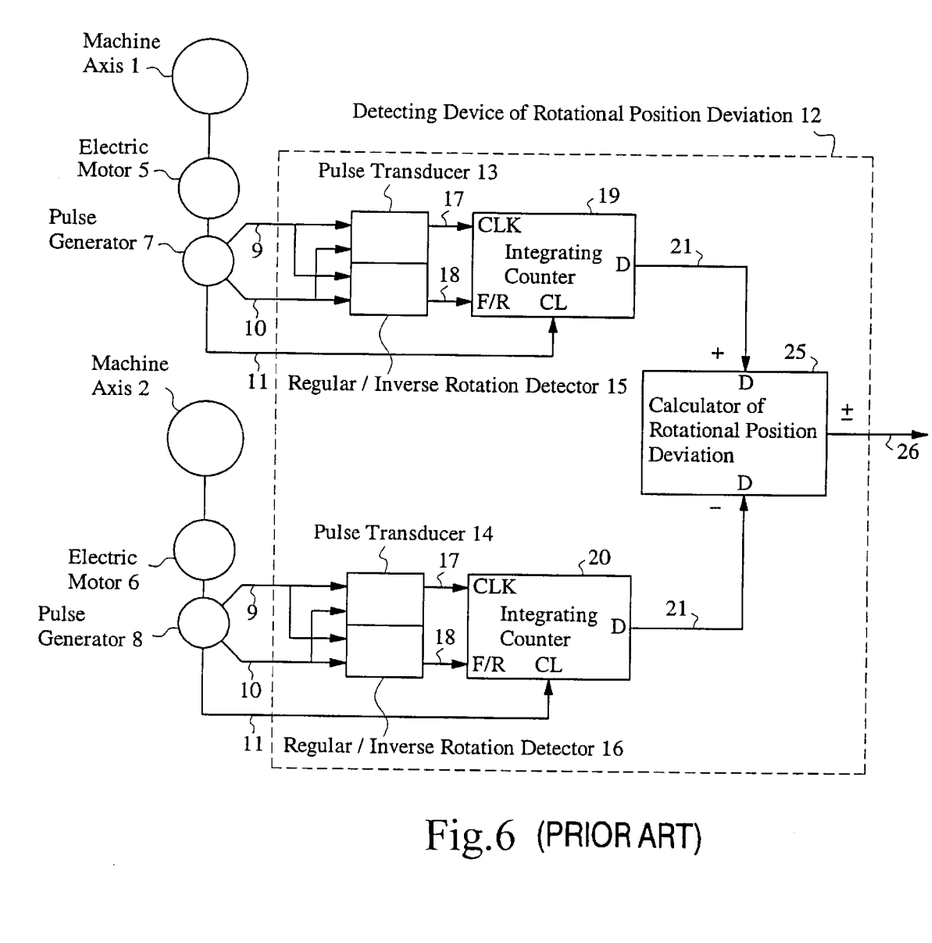
FIG. 6 shows a block diagram of the prior art.

FIG. 6 shows an example of a conventional device for detecting rotational position deviation. In FIG. 6, 1 and 2 are machine axes, 5 and 6 are electric motors, 7 and 8 are two-phase (A phase and B phase) pulse generators having zero phase which are attached to the electric motor axes, 9 is an A phase signal, 10 is a B phase signal and 11 is a zero phase pulse which is outputted by each one rotation of electric motors 5 and 6.

12 is a device for detecting rotational position deviation, and 13 and 14 are pulse transducers transforming two pulse trains which are outputted from the pulse generators 7 and 8 into one pulse train. The pulse transducers 13 and 14 output pulse train signals 17 according to the rotation of the electric motors 5 and 6. Further, 15 and 16 are regular/inverse rotation detectors, which detect regular or reverse rotation of the electric motors 5 and 6, and output the rotational direction. signal 18.

19 and 20 are integrating counters counting up or down the pulse train signals 17 according to the rotational direction signal 18 and clearing them by zero phase pulse 11.

25 is a calculator of rotational position deviation detecting the deviation by calculating the output 21 of the integrating counters 19 and 20, and its output 26 is used, for example, for synchronous control of an induction electric motor (not shown).

Figure 7:
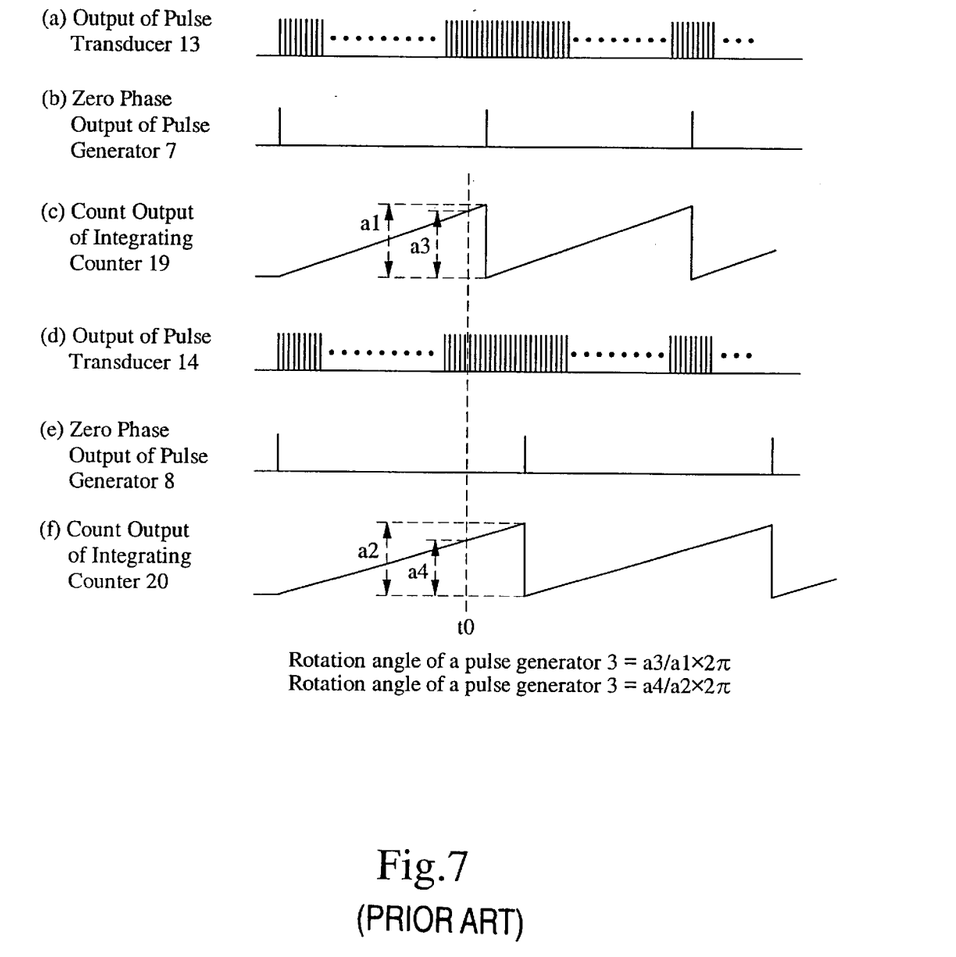
FIG. 7 shows a drawing explaining the action of the prior art.

FIG. 7 shows an action of the device for detecting rotational position deviation of FIG. 6, as follows. The action of FIG. 6 is explained by referring to FIG. 7. FIGS. 7(a) and (d) show output pulses from the pulse transducers 13 and 14, (b) and (e) show zero phase pulses from the pulse generators 7 and 8, and (c) and (f) show count outputs of the integrating counters 19 and 20.

As shown in FIG. 7, the integrating counters 19 and 20 count the output pulses from the pulse transducers 13 and 14, and they are cleared when the zero phase is outputted, and recount output pulses from the pulse transducers 13 and 14 again.

Accordingly, the counted values of the integrating counters 19 and 20 correspond to the rotation angle of the pulse generators 7 and 8. For example, in FIG. 7, when the counted values of the integrating counters 19 and 20 at time t0 are a3 and a4 respectively, the rotation angles of the pulse generators 7 and 8 at time t0 are each $a3/a1 \times 2\pi$ and $a4/a2 \times 2\pi$, where the number of pulses by one rotation counted from the zero phase pulse are a1 and a2, respectively.

That is, the counted values a3 and a4 of the integrating counters 19 and 20 show the rotation angles of the pulse generators 7 and 8. The counted values of the integrating counters 19 and 20 are inputted into the calculator of rotational position deviation 25. The calculator of rotational position deviation 25 calculates the rotational deviation of the electric motors 5 and 6 and outputs it as deviation output 26.

However, consider, for example, a case for accurately synchronously controlling two machine axes connected to the electric motors. When a deceleration mechanism is attached to one electric motor, which is connected to the machine axis, or both electric motors employ deceleration mechanisms, the machine axes connected to the electric motors are not precisely controlled synchronously, even if the deviation is measured by calculating the count output of the integrating counter. The present invention is originated by considering the above-mentioned points.

SUMMARY OF THE INVENTION

An object of the present invention is to solve the problems and provides a device for detecting rotational position deviation, which can control synchronously the machine axes driven by the electric motors even if they have a deceleration mechanism with any deceleration rate.

The device for detecting rotational position deviation of the present invention detects rotational position deviation of machine axes driven by electric motors with pulse signals, which are outputted, from pulse generators of incremental systems, which are attached to at least two electric motors.

Further, the present invention comprises the following components.

At least one deceleration mechanism between an electric motor and a machine axis comprises a pulse transducer transforming two pulse trains that are outputted from the pulse generators, into one pulse train. Further, it comprises an integrating counter corresponding to the electric motor, calculating a pulse train that is outputted from the above-mentioned pulse transducer corresponding to the rotation angle, and clearing them by the zero phase pulse that is outputted by each one rotation of the pulse generator. Also, it comprises a count transducer transforming the count output from the integrating counter. Furthermore, it comprises a rotational position deviation calculator outputting a rotational position error by calculating outputs from the integrating counter and count transducer.

The count transducer transforms the count output of the integrating counter to the count value corresponding to the deceleration ratio of said deceleration mechanism, and outputs it to the rotational position deviation calculator.

In the present invention, as the count transducer is employed and the count output of the integrating counter is transformed to the count value corresponding to the deceleration ratio, the machine axes are precisely synchronously controlled, even if the deceleration mechanism with a different deceleration ratio is attached between the electric motor axis and the machine axis.

DETAILED DESCRIPTION OF THE INVENTION

In the following description, modes for implementing the present invention are explained referring to FIGS. 1, 2, 3, 4 and 5.

Figure 1:
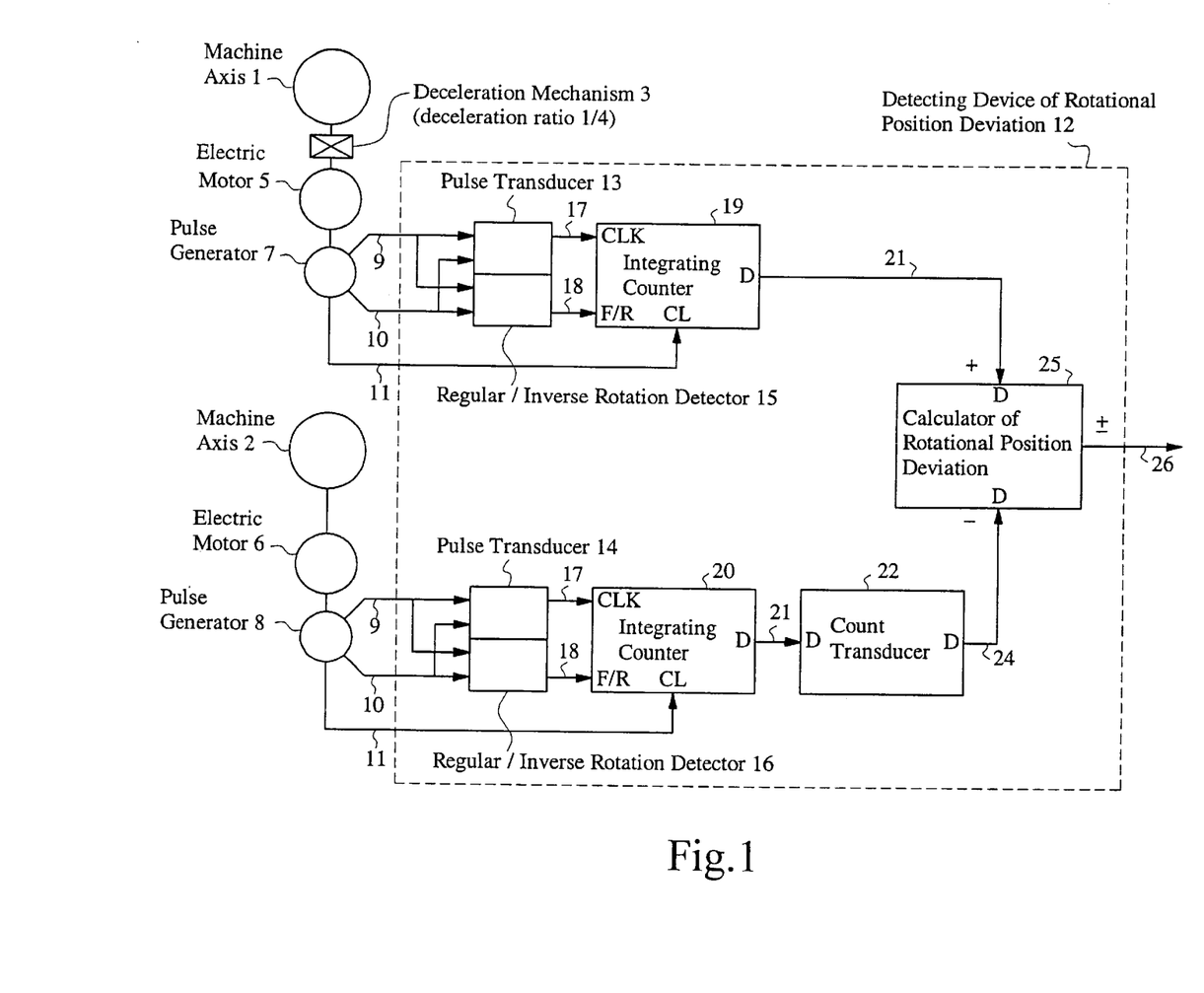
FIG. 1 shows a block diagram of the first embodiment according to the present invention.
Figure 2:
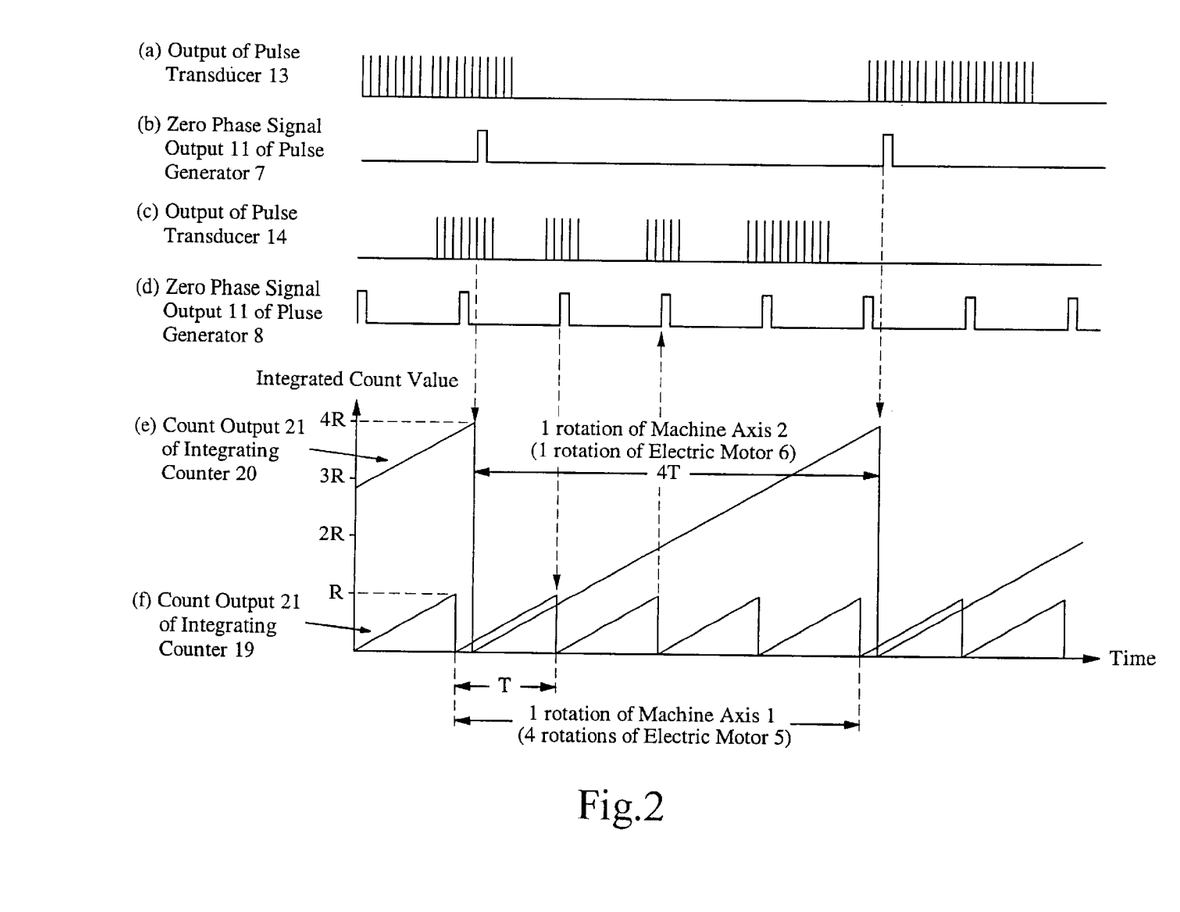
FIG. 2 shows a drawing (1) explaining the action of the first embodiment according to the present invention.
Figure 3:
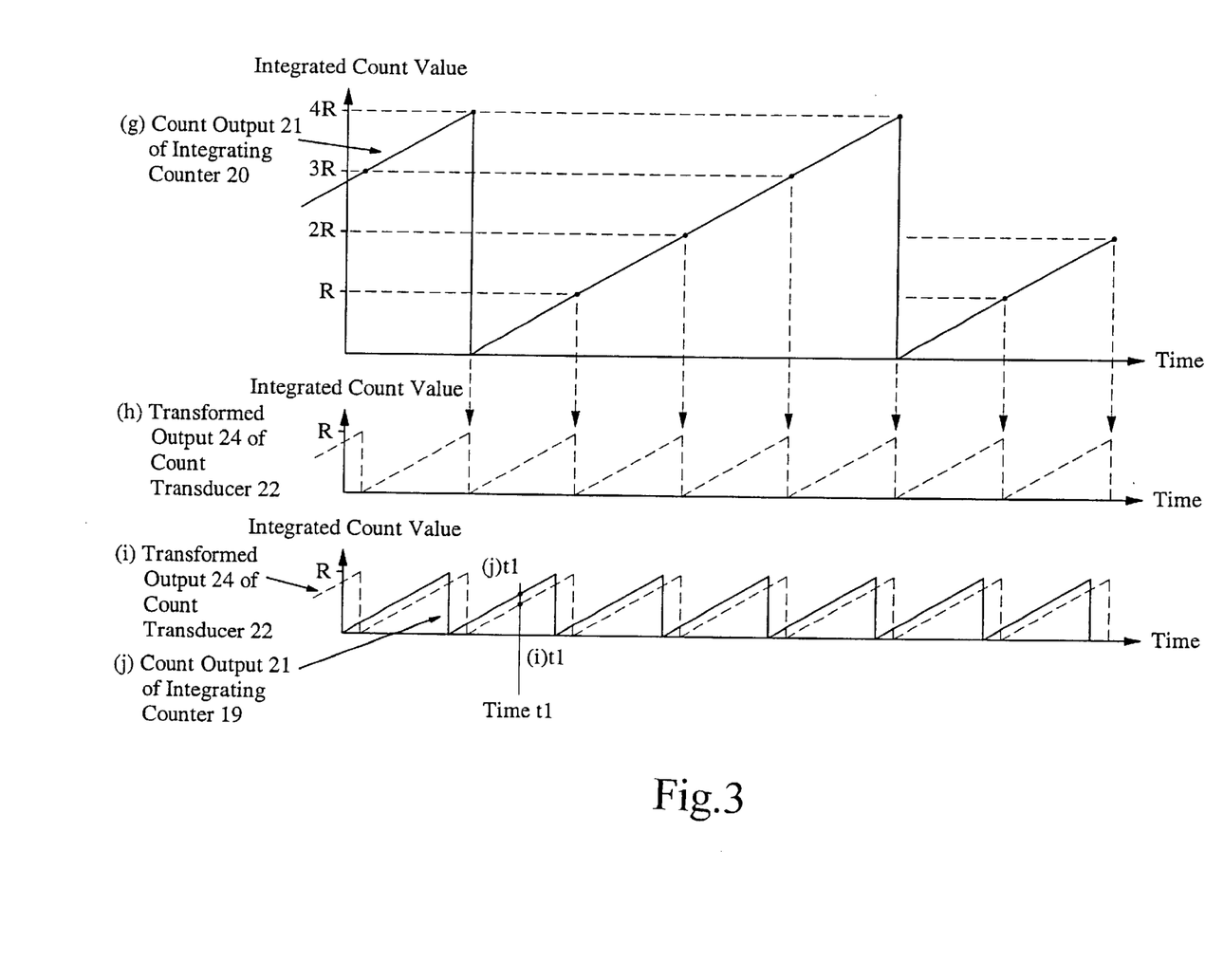
FIG. 3 shows a drawing (2) explaining the action of the first embodiment according to the present invention.

FIG. 1 shows components of the first embodiment of the device for detecting the rotational position deviation according to the present invention. FIG. 2 and FIG. 3 show the action of FIG. 1. The same symbols and reference numbers used in FIG. 6 are used for the same components and parts having the same functions as in the other figures.

In FIG. 1, 3 is a deceleration mechanism, 12 is a device for detecting a rotational position deviation, and 22 is a count transducer. In the following embodiment, explained is the device for detecting a rotational position deviation, which detects this deviation between one machine axis I and another machine axis 2 driven, through deceleration mechanism 3, by respective electric motors 5, 6 (at least two electric motors) by using pulse signals outputted from respective pulse generators 7, 8 of incremental systems. And each of the pulse generators 7, 8 is attached to the electric motors 5, 6, respectively.

The device for detecting rotational position deviation 12 is composed of pulse transducers 13 and 14 transforming two pulse trains that are outputted from the pulse generators 7 and 8 into one pulse train, integrating counters 19 and 20 corresponding to the number of the electric motors 5 and 6, a count transducer 22 transforming the count output of the integrating counter 20, a calculator of rotational position deviation 25 outputting a rotational position error which is r <obtained by calculating the output of the integrating counter 19 and the count /I transducer 22 as deviation output 26.

In the following example, in order to simplify the explanation, the deceleration ratio of the deceleration mechanism 3 is ¼ of the rotation of another electric motor 6, the number of pulses per one rotation of the pulse generator 7 is R, and the number of pulses per one rotation of pulse generator 8 is 4×R. Now, the embodiment of FIG. 1 shows an example for obtaining rotational position deviation between two machines, which has the electric motor 5 as a master and the electric motor 6 as a slave. But the present invention can be used in other cases that have plural slaves for one master.

Next, the action (operation) of the embodiment of FIG. 1 is explained by referring to FIG. 2 and FIG. 3.

As shown in FIG. 1, the rotational frequency of the machine axis 1 is decelerated to ¼ by the deceleration mechanism 3, and the rotation of the electric motor 6 is transmitted to the machine axis 2 with no deceleration. A phase signal 9 and B phase signal 10 from the pulse generator 7 and 8 are sent to the pulse transducer 13 and 14, and the regular/inverse rotation detector 15 and 16. The regular/inverse rotation detectors 15 and 16 detect the regular/inverse action by the above mentioned A phase signal 9 and B phase signal 10, and outputs the rotational direction signal 18 to the integrating counters 19 and 20. By this, the integrating counters 19 and 20 perform a count-up or count-down mode corresponding to the rotational direction of the electric motor.

On the other hand, the pulse transducers 13 and 14 transform the above mentioned A phase signal 9 and B phase signal 10 into one pulse train, and send it to the clock input CLK of the integrating counters 19 and 20. The integrating counters 19 and 20 count up or count down pulses one by one when the pulse is inputted from the pulse transducers 13 and 14 to the above-mentioned CLK.

Zero phase pulse 1 I from the pulse generators 7 and 8 are sent to a clear input CL of the integrating counters 19 and 20. By this, the counted value of the integrating counters 19 and 20 are reset to zero by each one rotation of electric motors 5 and 6. Further the count output 21 of the integrating counter 19 is inputted into the calculator of the rotational position deviation 25, and the count output 21 of the integrating counter 20 is sent to the count transducer 22.

The count transducer 22 corrects the count output of the integrating counter 20 corresponding to the deceleration ratio ¼ so as to be equivalent to the count output 21 of the integrating counter 19, and the transformed output 24 is inputted to the calculator of the rotational position deviation 25.

As mentioned above, the integrating counters 19 and 20 are composed of simple components, which are operated by the two-phase pulses 9 and 10, and zero phase pulse 11, and the counters are capable of fast action.

Next, the action (operation) of the first embodiment of the present invention is explained by referring to FIG. 2 and FIG. 3.

In FIGS. 2, (a) and (c) show output pulses from the pulse transducer 1.3 and 14, respectively. And (b) and (d) show zero phase pulses which are outputted from the pulse generators 7 and 8, respectively. Further in FIG. 2, (e) and (f) show the counted value 21 of the integrating counters 20 and 19, respectively.

Now, the number of pulses per one rotation of the pulse generator 7 is R pulses as mentioned above, so that the count output 21 of the integrating counter 19 is cleared after it is counted up from 0 to R, repeatedly. Further, the number of pulses per one rotation of the pulse generator 8 is 4R, so that the count output 21 of the integrating counter 20 is cleared after it is counted up from 0 to 4R, repeatedly.

As shown in FIGS. 2(e) and (f), when the rotational frequency of the machine axes 1 and 2 of FIG. 1 are same, the deceleration ratio of the deceleration mechanism 3 is ¼; therefore, if a period that the count output 21 of the integrating counter 19 is counted up from 0 to R, is T, a period that the count output 21 of the integrating counter 20 is counted up from 0 to 2R, is 4T. Now, one rotation time of the electric motor 6 is 4T (one rotation of the machine axis), and one rotation of the electric motor 5 (¼ rotation of the machine axis) is T.

FIGS. 3(*g*) and (*h*) show an action (operation) of the count transducer 22.

In FIG. 3(*g*), a maximum value of the counted value 21 of the integrating counter 20 is 4R, further the count transducer 22 processes the following equations (1)–(4), based on R, 2R, 3R and 4R of the counted value 21 of the integrating counter 20. Here, the counted value 21 of the integrating counter 20 of FIG. 3(*g*) is Cn, and the output 24 of the count transducer 22 is Cnv.

when $0 \leq Cn < R$, $$Cnv = Cn \qquad (1)$$

when $R \leq Cn < 2R$, $$Cnv = Cn - R \qquad (2)$$

when $2R \leq Cn < 3R$, $$Cnv = Cn - 2R \qquad (3)$$

when $3R \leq Cn \leq 4R$, $$Cnv = Cn - 3R \qquad (4)$$

When the count transducer 22 processes the above-mentioned equations (1)–(4), the transformed output 24 of the count transducer 22 is shown in FIG. 3(*h*).

FIGS. 3(*i*) and (*j*) show drawings putting FIG. 2(*f*) and FIG. 3(*h*) together. The counted value 21 and the output 24 are inputted to the calculator of rotational position deviation 25 so as to calculate the deviation and the deviation output 26 is outputted.

The calculator of rotational position deviation 25 always calculates the deviation between (i) and (j) and outputs it. In FIGS. 3(*i*) and (*j*), the calculator of rotational position deviation 25 obtains a deviation ΔP between counted value (j)$_{t1}$ of the integrating counter 19 at time t1 and the transformed output (i)$_{t1}$ of the count transducer 22 by the following equation (5), and sends it to a driving device of an inverter etc. (not shown) and controls the machine axis I and the machine axis 2 synchronously.

$$\Delta P = (j)_{t1} - (i)_{t1} \qquad (5)$$

Now, in the example of FIG. 1, FIG. 2 and FIG. 3, the deceleration ratio of the deceleration mechanism 3 is given as ¼; however another deceleration ratio may be used by changing the process of the count transducer 22 according to the deceleration ratio of the deceleration mechanism 3.

Figure 4:
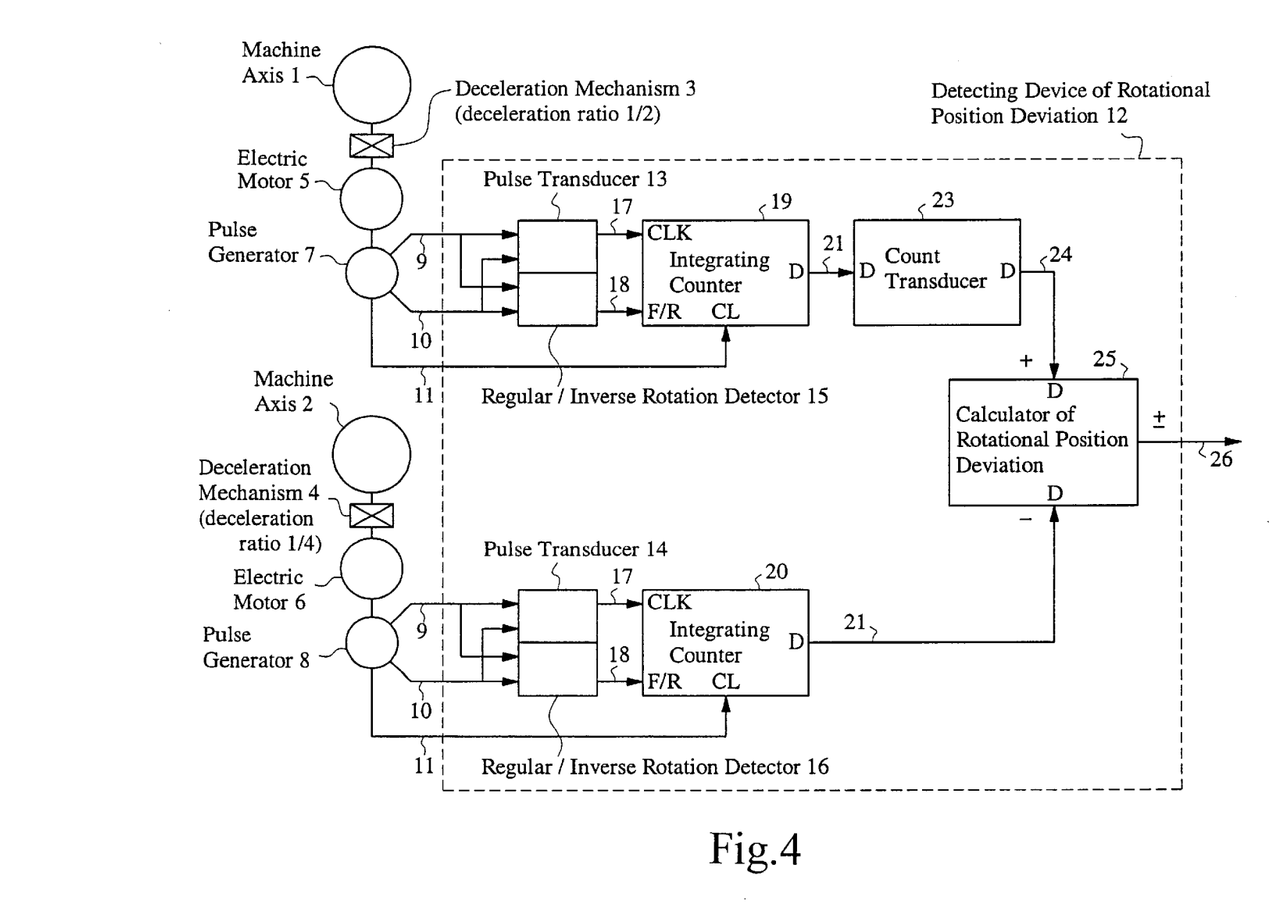
FIG. 4 shows a block diagram of the second embodiment according to the present invention.
Figure 5:
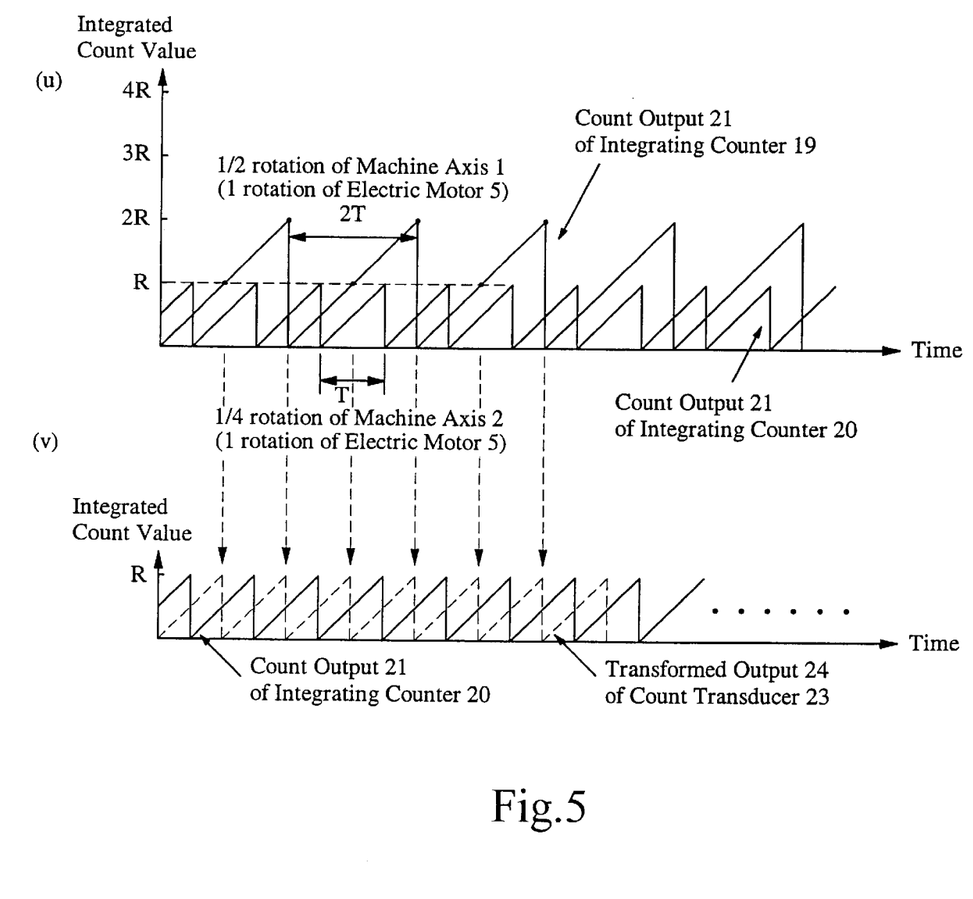
FIG. 5 shows a drawing explaining the action of the second embodiment according to the present invention.

FIG. 4 shows components of the second embodiment according to the present invention, and FIG. 5 shows the action of FIG. 4. In FIG. 4, the same parts shown in FIG. 1 and FIG. 6 are referred to using the same symbols and reference numbers. The present embodiment shows that electric motors 5 and 6 are equipped with deceleration mechanisms 3 and 4, and a count transducer 23 is provided in a circuit with deceleration mechanism 3.

In FIG. 4, the device for detecting rotational position deviation 12 is composed of the pulse transducers 13, 14 transforming two pulse trains which are outputted from the pulse generators 7 and 8 to one pulse train, the integrating counters 19 and 20 corresponding to the numbers of the electric motors 5 and 6, a count transducer 23 transforming the count output of the integrating counter 19, and a calculator of rotational position deviation 25 outputting the rotation position deviation as deviation output 26, which is obtained by calculating the count output of the integrating counter 20 and transformed output of the count transducer 23.

In the following embodiment for simplified explanation, the deceleration ratio of the deceleration mechanism 3 is assumed to be ½, the deceleration ratio of the deceleration mechanism 4 is assumed to be ¼, the number of pulses per one rotation of the pulse generator 7 is 2R and the number of pulses per one rotation of the pulse generator 8 is R.

Referring to FIG. 5, an action (operation) of the second embodiment of the present invention is explained.

FIG. 5(*u*) shows the count outputs 21 of the integrating counters 19 and 20. As the number of pulses per one rotation of the pulse generator 7 is 2R, the count output 21 of the integrating counter 19 is cleared after it is counted up from 0 to 2R, repeatedly. Further as the number of pulses per one rotation of the pulse generator 8 is R as mentioned above, the output 21 of the integrating counter 20 is cleared after it is counted up from 0 to R, repeatedly.

As shown in FIG. 5(*u*), when the rotational frequency of the machine axes 1 and 2 are same, the deceleration ratio of the deceleration mechanism 3 is ½ and the deceleration ratio of the deceleration mechanism 4 is ¼. Therefore, if a period that the count output 21 of the integrating counter 20 is counted up from 0 to R, is T, a period that the count output 21 of the integrating counter 19 is counted up from 0 to 2R, is 2T. Further, one rotation time (½ rotation of the machine axis) of the electric motor 5 is 2T, one rotation time (¼ rotation of the machine axis) of the electric motor 6 is T.

The count transducer 23 processes the following equations (1)–(2), as mentioned above. Here, the count output 21 of the integrating counter 19 is Cn, and the transformed output 24 of the count transducer 23 is Cnv.

when $0 \leq Cn < R$, $$Cnv = Cn \qquad (1)$$

when $R \leq Cn \leq 2R$, $$Cnv = Cn - R \qquad (2)$$

By processing the equations (1)–(2) with the count transducer 23, the transformed output 24 is shown in FIG. 5(*v*).

The transformed output 24 of the above mentioned count transducer 23 and the count output 21 of the integrating counter 20 are inputted into the calculator of rotational position deviation 25, and it calculates the deviation and outputs the deviation output 26, as mentioned above. The deviation output is sent to the driving device of an inverter etc. not shown, and the machine axis I and machine axis 2 can be controlled synchronously.

Now, in the above-mentioned embodiments, the deceleration ratio of the two deceleration mechanisms are different, but the present invention is applied to a case when the ratio of the deceleration mechanism attached to each machine axis is same.

As mentioned above, in the present invention, a count transducer is provided in order to transform the count output of the integrating counter to the value corresponding to the deceleration ratio, so that the machine axes can be controlled precisely synchronously with each other, even if a deceleration mechanism is provided between an electric motor axis and a machine axis.

What is claimed is:

1. A device for detecting rotational position deviation of two or more rotating machine axes, each driven by an electric motor, comprising:

at least one deceleration mechanism provided between at least one motor and the machine axis driven by the motor;

a pulse generator of each motor, for generating two pulse trains as the motor rotates and a zero phase pulse for each single full rotation of the motor;

a pulse transducer connected to each pulse generator, for transforming the pulse trains into one pulse train;

an integrating counter connected to each pulse transducer for integrating the pulse train from the pulse transducer and a zero phase pulse produced by each rotation of said machine axis, and for counting said pulse train and clearing them by said zero phase pulse, to produce a count output corresponding to the rotation angle of the machine axis;

a count transducer connected to the first integrating-counter associated with one motor, for transforming the count outputted from that. first integrating counter into an amended count according to the deceleration ratio of the deceleration mechanism; and a calculator connected to the count transducer. and the second integrating counter associated with another motor, for obtaining the rotational position deviation based on each output from that count transducer and that second integrating counter.

* * * * *